(12) United States Patent
Fleming et al.

(10) Patent No.: US 8,591,607 B2
(45) Date of Patent: Nov. 26, 2013

(54) BENEFICIATION OF COAL

(75) Inventors: Grant Fleming, Lennox Head (AU); Greig Freeman, Lennox Head (AU)

(73) Assignee: Global Coal Solutions Pty Ltd, Lennox Head, NSW (AU)

(*) Notice: Subject to any disclaimer, the term of this patent is extended or adjusted under 35 U.S.C. 154(b) by 578 days.

(21) Appl. No.: 12/677,276

(22) PCT Filed: Aug. 18, 2008

(86) PCT No.: PCT/AU2008/001201
§ 371 (c)(1),
(2), (4) Date: Jun. 10, 2010

(87) PCT Pub. No.: WO2009/033203
PCT Pub. Date: Mar. 19, 2009

(65) Prior Publication Data
US 2010/0287828 A1 Nov. 18, 2010

(30) Foreign Application Priority Data
Sep. 10, 2007 (AU) ............... 2007904954

(51) Int. Cl.
*C10L 5/00* (2006.01)
*B03D 1/00* (2006.01)
(52) U.S. Cl.
USPC ............... 44/621; 44/626; 209/166; 209/167; 209/168; 241/5; 241/17

(58) Field of Classification Search
USPC ............ 209/166, 167, 168, 5; 241/5, 17; 44/621, 626
See application file for complete search history.

(56) References Cited

U.S. PATENT DOCUMENTS

| | | | | | |
|---|---|---|---|---|---|
| 2,330,479 | A | * | 9/1943 | Erickson | 241/20 |
| 3,696,923 | A | * | 10/1972 | Miller | 209/17 |
| 3,807,557 | A | * | 4/1974 | Miller | 209/166 |
| 3,908,912 | A | * | 9/1975 | Irons et al. | 241/20 |
| 4,313,737 | A | | 2/1982 | Massey et al. | |
| 4,377,473 | A | * | 3/1983 | Laros et al. | 209/167 |
| 4,388,181 | A | * | 6/1983 | Rainis et al. | 209/5 |
| 4,448,678 | A | | 5/1984 | Gentry | |
| 4,783,263 | A | * | 11/1988 | Trost et al. | 210/638 |
| 4,826,588 | A | * | 5/1989 | Klimpel et al. | 209/167 |
| 5,032,257 | A | * | 7/1991 | Kulkarni | 209/168 |
| 7,407,121 | B2 | * | 8/2008 | Kerns et al. | 241/5 |

OTHER PUBLICATIONS

PCT International Search Report and Written Opinion of the International Searching Authority, Applic. No. PCT/AU2008/0012101, Australian Patent Office, Oct. 10, 2008, 6 pages.

* cited by examiner

*Primary Examiner* — Nina Bhat
(74) *Attorney, Agent, or Firm* — Snell & Wilmer L.L.P.

(57) ABSTRACT

A process for improving mined coal includes comminuting the coal to a particle size at which individual macerals are available. Reactive macerals are extracted from the comminuted coal as froth from the top of a deep-column flotation cell. The extracted macerals are then de-watered.

12 Claims, 2 Drawing Sheets

BENEFICIATION OF COAL

TECHNICAL FIELD

This invention concerns the beneficiation of coal, in particular a process for improving mined coal. In another aspect the invention concerns a commercial scale processing plant for mined coal. In a further aspect the invention is automotive tyres manufactured using the improved coal.

BACKGROUND ART

Coal is an important fossil fuel used, for instance, in the large scale generation of electricity at coal-fired power stations. Consisting mainly of carbon, coal releases carbon dioxide when it is combusted; a recognised greenhouse gas. Coal also contains other extraneous materials, therefore its combustion produces other gases and ash as by-products and some of these may pollute the environment.

The end use of coal can be determined by reference to its Maceral composition. Macerals are the metamorphised remains of the vegetation matter from which the coal was originally formed. There are three main groups of Macerals recognised in coals: Vitrinite, Liptinite (previously named Exinite) and Inertinite. These are in turn subdivided according to the detailed character of the Maceral's material.

The major types of coal in the world, Humic and Sapropelic, covering Cannel and Boghead coals, are defined and identified by the number and combination of the three Macerals that they contain.

Each of the three Maceral groups have different characteristics and properties such as Density, Specific Energy, Volatile Matter, Fixed Carbon and Ash Contents. Macerals generally fall into two classes based on their contribution to the combustion of coal—the Reactive and Inert classes. The Reactive Macerals, Vitrinite and Liptinite, display high Specific Energies and very low ash contents. Inertinite also actively participates in the combustion of coal, but to a lesser degree because it has a higher ash content.

DISCLOSURE OF THE INVENTION

The invention is a commercial scale process for improving coal, comprising the steps of:
  Comminuting coal to a particle size at which individual Macerals are available.
  Extracting reactive Macerals from the comminuted coal as froth from the top of a deep-column flotation cell.
  Dewatering the extracted Macerals.
  By use of the phrase "commercial scale" we intend to distinguish from laboratory scale processes.

The process is designed to liberate and recover a higher than usual proportion of a coal's reactive Macerals. This provides a saleable end-product having a reduced ash content, which results in less ash producing material being burnt for the same amount of power generated.

The comminuting process preferably includes only dry grinding stages, although wet processing is not excluded. The aim is to reduce the particle size to 75 to 100 micron topsize before commencing the "extracting" step. Some material will be recycled to the dry grinding stage to ensure optimal Maceral liberation.

A dry classifier may receive coal particles from the dry grinding stages. A wet cyclone separation will typically follow the dry classifier, and a sieving process may follow the wet cyclone. Coal particles from any one or more of these processes may also be recycled through the dry grinding stages.

The extracting step makes use of one or more deep-column flotation cells. The slurry entering the flotation cells is chemically treated by adding reagents that assist the flotation process. The addition of these reagents is monitored and adjusted throughout the process as required. The flotation cells use compressed air, that is introduced into the cell at a controlled pressure and flowrate, to produce an air bubble size that facilitates the Maceral flotation.

The Maceral product released by the flotation process will be dried and then pelletised to a convenient size for transport and subsequent use. Alternatively, the small particle size of the flotation process product makes it suitable as a pre-milled power station fuel. This could allow a power station to completely bypass its own in-house pulverizers.

The coal produced by this process has low volatility, low moisture content and neutral PH. As a result it is useful as a filler for the production of automotive tyres provided it is milled to a median particle size of about 5 microns. In a further aspect the invention is automotive tyres manufactured using this coal.

A by-product of the flotation process is a high-mineral content material, that can be used in agriculture for soil improvement. In addition, the by product may be further treated in a series of flotation cells designed to release selected minerals or metals.

In a further aspect the invention is a coal processing plant, comprising
  A comminuting station to reduce the size of coal particles to a point at which individual Macerals are available.
  A deep-column flotation cell to extract reactive Macerals from the comminuted coal as froth that rises to the top of the cell.
  A dewatering station.
  And, optionally a pelletizing facility.
In a further aspect the invention is automotive tyres manufactured using the improved coal. Other products that might be made include coal filler, carbon fibre, activated carbon, paints, sealants and caulks.

BRIEF DESCRIPTION OF THE DRAWINGS

An example of the invention will now be described with reference to the accompanying drawings, in which.

BEST MODES OF THE INVENTION

Figure 1:
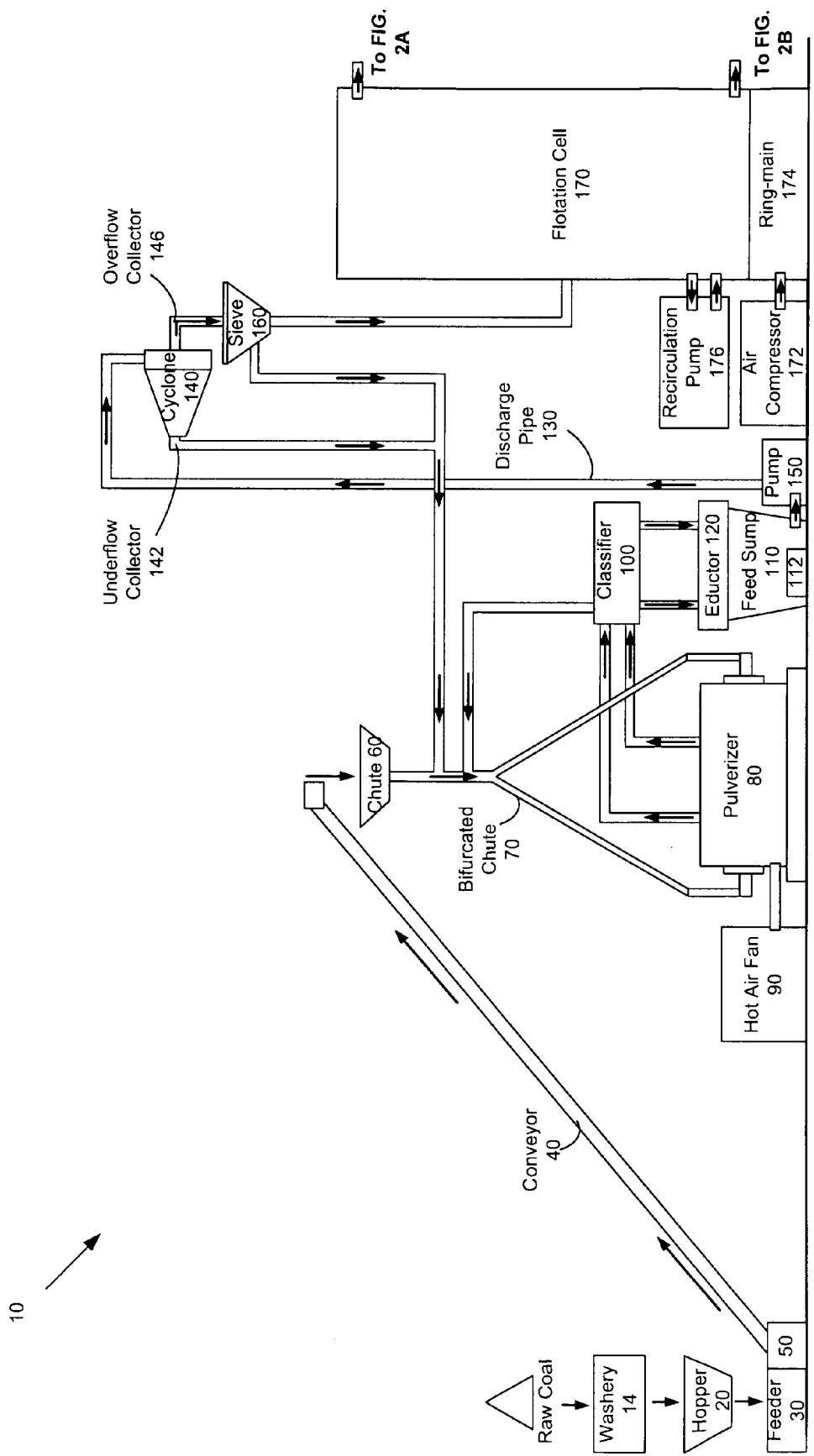
FIG. 1 is diagram of a coal processing plant, illustrated with arrows showing the flow of the beneficiation process.

Referring first to FIG. 1 a pilot plant for carbon liberation processing of coal 10 is constructed either 'on-site' at a coal mine, or remote from a coal mine site perhaps near its place of use. This plant has a nominal throughput of 70 t/h.

The coal may be supplied to the plant in a 'washed' condition. Where washing is performed at the mine site, for instance, there may be economies of scale in the pre-wash process.

Alternatively, coal may be supplied to the plant in its 'raw', or as-mined condition. The coal may then be passed through a 'washery' 14 to remove extraneous or unwanted material. Between 15 to 35% of the material can be removed by this process. The material discarded has no commercial value but its removal adds value by lowering the ash-content.

Once delivered to the plant, the coal feedstock is stockpiled in a heap that typically will allow plant processing to continue for say 2 to 3 days, simply to overcome any unforeseen raw material delivery interruptions.

Coal in either 'as-mined' or 'washed' condition is subsequently processed by the plant in the same manner. However, the yield and the operating cost of the plant will differ depending upon the condition of the feedstock. A pre-wash plant will generally pre-size, or crush, the coal to a maximum particle size of 50 mm, and will reject harder material.

The stockpiled coal, with a maximum topsize of 50 mm, is then withdrawn at a rate of approximately 70 t/h and dumped into a feed hopper 20 mounted above a variable-speed, spring-mounted vibrating feeder 30.

The plant feeder discharges its contents onto an inclined conveyor 40 at a variable rate that is controlled by a single-idler, load-cell type, belt-weigher 50. This device is mounted under the conveyor slightly down-stream of the discharge point.

The conveyor 40 transports the coal material to a head chute 60 where the coal is discharged. The head chute 60 is mounted on an elevated platform above a bifurcated chute 70 which will equally split the Feed Conveyor's discharge into two streams and allow the coal material to gravitate into the two feed inlet chutes of the pulveriser 80.

The rod-mill pulveriser 80 consists of a rotating drum containing a number of steel rods. As the drum rotates about its horizontal axis, the steel rods, in turn, rotate and grind, or pulverize, the coal material that is fed into both ends of the drum. The coal is reduced in size by this action until discharged; ideally at about 75-100 micron top-size.

A high-capacity fan 90 delivers heated air at about 220° Celsius into each end of the pulveriser 80. This hot air is continuously recirculated through the drum and exits at around 80° Celsius. The heat prevents coal particles agglomerating and 'balling', especially where clays are present in the feedstock. The high volume air flow pressurises the drum and pneumatically conveys away the fine coal dust particles generated by the pulveriser's milling action as it exits.

The 'liberated' dust, nominally with a maximum topsize of 75-100 micron, is passed through a dry, or pneumatic, classifier 100. Oversized particles greater than 75-100 microns are returned to the drum 80 from the classifier 100 for further milling. The remaining particles are carried by the air flow and directed, via wear-resistant piping, to a large capacity (25 m$^3$) water-filled, classifying cyclone feed sump 110.

At the classifying cyclone feed sump 110, the coal dust reporting from the pulveriser 80 is passed through an 'eductor' 120, where it is mixed with water. This is necessary to 'wet' the fine coal particle surfaces and avoid 'rafting', where fine coal particles agglomerate and float because they are simply too light to overcome the surface tension of the air/water interface. The whetted fine coal particles break through the water surface and continue to sink down and enter the classifying cyclone feed pump's discharge pipe 130 to be pumped up to the 1000 mm diameter classifying cyclone 140.

Make-up water is automatically added at the feed sump 110 via the 'eductor' 120 to maintain a constant level within the sump. The amount of makeup water is controlled by a pressure sensor 112 attached to the sump that monitors the depth of water above its location. This constant level condition ensures constant pumping conditions exist which, in turn, result in constant operating conditions inside the cyclone 140.

A variable-speed feed pump 150 delivers coal-and-water slurry from the feed sump 110 to the classifying cyclone 140. This slurry will contain about 150 t/h of coal, which equates to a solids concentration of 14.3% by weight or, depending on the density of the solids, about 10.3% by volume.

At this point there may still be particles with a topsize of up to 750 microns in the slurry. The task of the classifying cyclone 140 is to split its feedstock into two streams, one having a nominal top-size of 100 microns, and the other having larger particles up to 750 microns that would be too large to be effectively recovered by the following downstream flotation process.

The Classifying Cyclone's over-flow and under-flow streams are separately collected. The underflow slurry exiting from the smaller end 142 of cyclone 140 contains predominantly coarser-sized particles. The underflow slurry is immediately recycled via appropriately-sized piping back to pulveriser 80 for further comminution. Oversized particles from the classifying cyclone's underflow stream may complete several more cycles before they are deemed to be acceptably-sized and finally released into the overflow stream.

The overflow slurry, consisting mainly of water and superfine particles, is discharged from the cyclone 140 at its larger end 146. The solids material in the overflow slurry will generally not exceed a size of about 100 microns, but particles misplaced during the particle size-separation process having a top-size of 200-350 microns can be expected to still be present. In order to ensure best product recoveries in the following flotation process, the classifying cyclone overflow slurry reports from its collection box, via a header, and onto a static curved, cross-flow sieve bend 160 for final screening to remove any excessively oversized material.

The sieve 160 consists of a 250 micron apertured wedge-wire deck that can be reversed to counter wear. Over-sized material retained on top of the sieve 160 is eventually discharged via piping back to the pulveriser 80 for further grinding.

The overflow slurry from the classifying cyclone consists of 75-100 micron-sized superfine particles. At this size the individual Macerals are available. These pass through the Sieve Bend's wedge-wire deck, are collected and then gravitated into the deep-column flotation cell 170. The job of the deep-column flotation cell 170 is to separate the more desired reactive Macerals from the inert Macerals and other unwanted material.

By chemically conditioning the overflow slurry, before it enters the deep-column flotation cell with various activators, promotors, collectors or frothers, the yield and quality of the 'floated' Macerals can be controlled.

The deep-column flotation cell 170 consists of a large diameter (4.88 m) upright tank about 16 to 17 m high, for instance a Jamieson cel. A high flow rate, low pressure, air compressor 172 delivers air into a ring-main 174 at the lower end of the cell column 170. The air is then injected into the cell through small nozzles in a sparge pipe that 'shred' the air into micron-sized bubbles. Additionally, a high-flowrate recirculation pump 176 continuously withdraws slurry from the bottom of the cell and re-injects it directly back into the cell to maintain a high level of turbulence within the cell.

The probability of a particle and one or more air bubbles colliding in the flotation cell 170 is high, due to the effects of the turbulence induced by the recirculation pump and the large number of micron-sized air bubbles present.

The flotation process takes advantage of the surface chemistry of both coal Macerals and tailings particles. Coal is hydrophobic (water hating) whereas, tailings, clays and other non-coal materials are hydrophilic.

Immediately a collision occurs, the reactive Maceral's surface properties allows the air bubble, or bubbles, to attach. If enough air bubbles attach to a coal Maceral, they will provide sufficient buoyancy to float the particle to the surface of the water in the cell. As more and more particles are floated, a thick coal-bearing froth is formed above the water surface. This froth eventually builds up and overflows from the cell 170 into a circumferential launder 180 located at the top of the cell column.

Figure 2A:
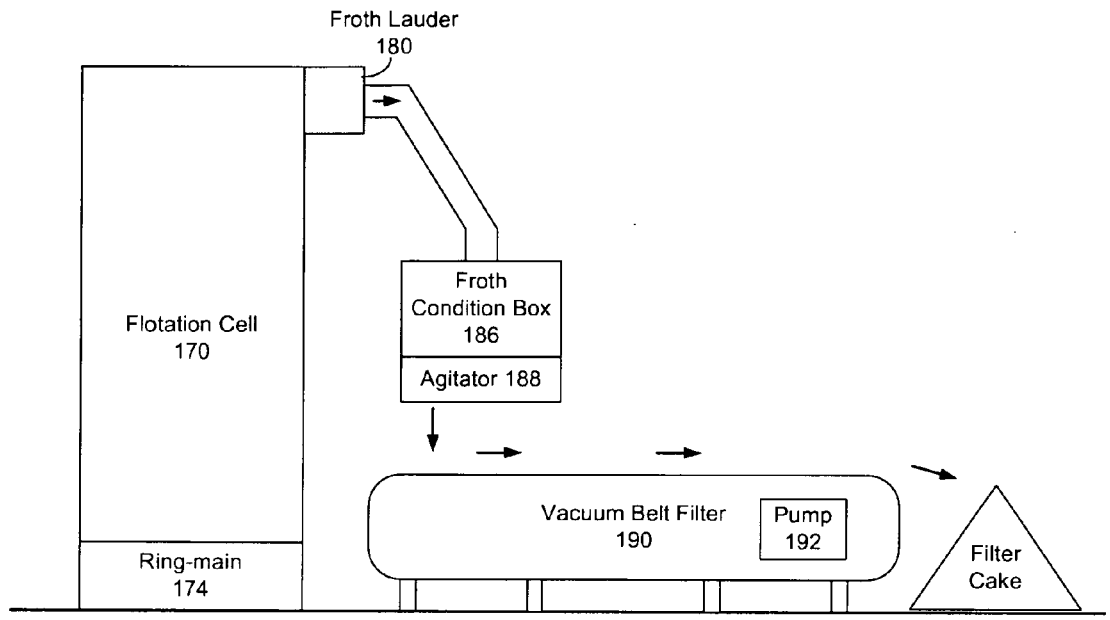
FIG. 2A is a diagram of a froth treatment process that continues from the process in FIG. 1. And,
  FIG. 2B is a diagram of a tailings treatment process that continues from the process in FIG. 1.

Referring now to FIG. 2A, the froth gravitates down to the filter feed conditioner box 186 where a low-shear agitator 188 breaks down the froth bubbles and coats the coal Macerals with a flocculant. After sufficient retention time, the coal slurry is distributed over the full belt width of a 50 m$^2$ area horizontal belt vacuum filter 190. A vacuum pump 192 continuously draws air through the slurry cake that is formed on the slow moving filter belt surface. This air flow removes water from the filter cake until the cake is finally discharged off the end of the filter belt.

The dewatered filter cake is then transported by conveyor to the product stockpile for subsequent disposal. Alternatively, this low ash-content, high energy product coal can be pelletized to provide a much harder, more easily handled product than the very friable filter cake. The recommended process is a totally binder-less system so the CLP plant's low ash-content end-product is not contaminated, for instance with cement dust binder.

Tailings and other non-coal lyophilic materials, also collide with the numerous air bubbles present in the flotation cell. However, they do not attach themselves to the bubbles as readily as the desired coal particles do. Being less bouyant, this generally, high ash-content material slowly sinks to the bottom of the cell. It is then pumped from the flotation cell to report to the plant's tailings thickener for later recovery.

Figure 2B:
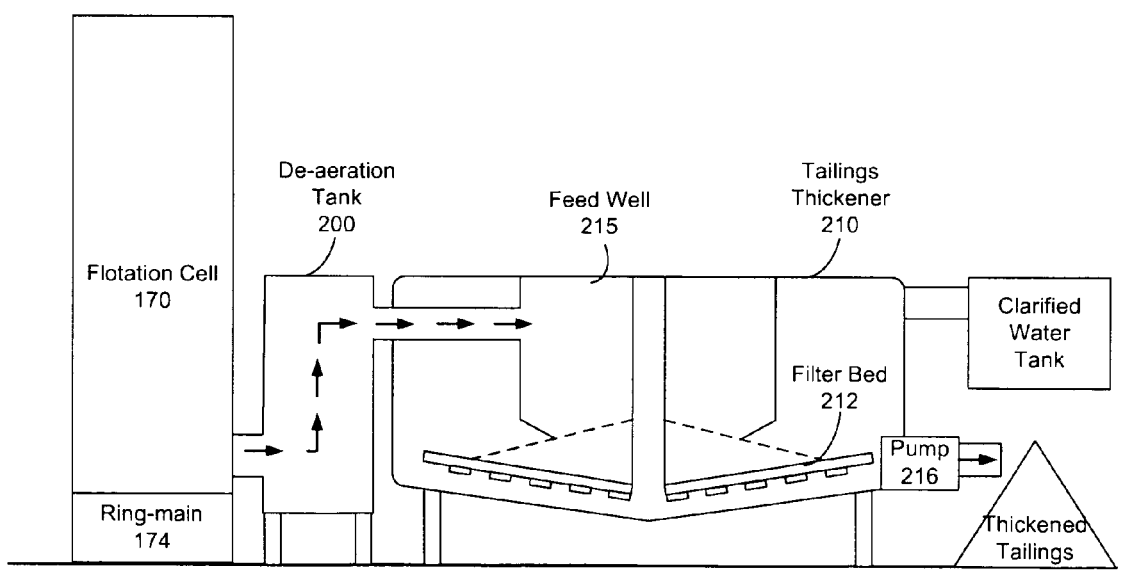

Referring to FIG. 2B, the thickener feedstock is initially discharged into a small diameter de-aeration tank 200 to allow any entrapped air in the slurry to be released. Flocculant may also be added to this tank before the tailings slurry passes to the tailings thickener's feed well 215 at the centre of the tank.

The tailings thickener 210 has a pre-formed bed 212 that acts as a filter, allowing fast dewatering and high feed rate. As the bed dewaters and thickens, water escapes and overflows from the thickener into a circumferential launder. This water is collected in a clarified water tank prior to being recirculated back to the plant for re-use.

An underflow pump 216 will continuously withdraw thickened tailings from the thickener. This material will have a very high mineral matter-content and may be sold as a by-product for agricultural use. Alternatively, the mineral tailings may be subjected to treatments typical of the metals separation industry, for instance in a series of flotation cells, magnetic separators and the like, in order to recover valuable metals.

Although the invention has been described with reference to a particular example, it should be appreciated that it could be exemplified in many other forms and in combination with other features not mentioned above. For instance, it may be possible to eliminate the heated air for the pulveriser. Another alternative is the use of a ball-mill pulveriser, and the entire pulverisation process may be wet.

The process may be carried out at a much larger, commercially-oriented scale of up to say, 600 t/h. Such a plant might be divided into a number of 150 or 200 t/h parallel-stream modules, depending on the availability of commercially manufactured equipment to perform the task. The major difference of the larger capacity plant would be in the method used to deliver and distribute coal to its individual modules or process streams.

The invention claimed is:

1. A commercial scale process for improving coal, comprising:
   comminuting coal to a particle size of 75 to 100 micron top-size and at which individual macerals are available;
   feeding the comminuted coal to a deep-column froth flotation cell;
   extracting reactive macerals from the comminuted coal as froth from the top of the flotation cell; and,
   dewatering the extracted macerals.

2. The commercial scale process for improving coal according to claim 1, wherein the comminuting process includes only dry grinding before commencing the extracting step.

3. The commercial scale process for improving coal according to claim 2, wherein a dry classifier receives coal particles from the dry grinding stages, wet cyclone separation follow the dry classifier, and a sieving process follows the wet cyclone.

4. The commercial scale process for improving coal according to claim 3, wherein, coal particles from any one or more of the dry grinding stages, dry classifier, wet cyclone and sieve are recycled through the dry grinding stages.

5. The commercial scale process for improving coal according to claim 1, wherein the extracting step makes use of one or more deep-column flotation cells.

6. The commercial scale process for improving coal according to claim 5, wherein the slurry entering the one or more, or each flotation cell is chemically treated according to its make up, and the chemical treatment is monitored and adjusted throughout the flotation process as required.

7. The commercial scale process for improving coal according to claim 5, wherein the flotation cells are operated with air pressure, flow rates and bubble size designed to float the selected reactive macerals.

8. The commercial scale process for improving coal according to claim 1, wherein the comminuting process continues until the size of the coal particles is reduced to a median size of about 5 microns.

9. The commercial scale process for improving coal according to claim 1, wherein the reactive macerals are pelletized.

10. The commercial scale process for improving coal according to claim 1, wherein a by-product having a high-mineral content is recovered from the flotation cells.

11. The commercial scale process for improving coal according to claim 1, wherein a by-product from the froth flotation cell is metalliferores.

12. The commercial scale process for improving coal according to claim 1, wherein a by-product from the froth flotation cell has a mineral content suitable for use in agriculture.

* * * * *